United States Patent
Chen et al.

(10) Patent No.: US 11,205,310 B1
(45) Date of Patent: Dec. 21, 2021

(54) BACKGROUND SKYBOX CONSTRUCTING METHOD AND ELECTRONIC DEVICE

(71) Applicant: HTC Corporation, Taoyuan (TW)

(72) Inventors: Jiun-Lin Chen, Taoyuan (TW); Jing-Lung Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/195,562

(22) Filed: Mar. 8, 2021

(51) Int. Cl.
| | |
|---|---|
| *G06T 19/20* | (2011.01) |
| *G06T 7/50* | (2017.01) |
| *G06T 7/73* | (2017.01) |
| *G06T 19/00* | (2011.01) |

(52) U.S. Cl.
CPC .............. *G06T 19/20* (2013.01); *G06T 7/50* (2017.01); *G06T 7/73* (2017.01); *G06T 19/006* (2013.01)

(58) Field of Classification Search
CPC .. G06T 19/20; G06T 7/50; G06T 7/73; G06T 19/006
See application file for complete search history.

(56) References Cited

U.S. PATENT DOCUMENTS

| | | | |
|---|---|---|---|
| 2013/0106855 A1* | 5/2013 | Urbach | G06T 15/08 345/424 |
| 2019/0238819 A1* | 8/2019 | Furukawa | H04N 13/00 |

\* cited by examiner

*Primary Examiner* — Chong Wu
(74) *Attorney, Agent, or Firm* — JCIPRNET

(57) ABSTRACT

The embodiments of the disclosure provide a background skybox constructing method and an electronic device. The method includes: obtaining a first content frame and re-projecting the first content frame, wherein the re-projected first content frame corresponds to a first visual angle and includes a plurality of first objects; in response to determining that the first content frame has a first depth map characterizing a depth of each first object, dividing the first objects into N first groups based on the depth of each first object, wherein N is a positive integer; constructing a first part of each of N skybox layers based on the N first groups, wherein the first part of each skybox layer corresponds to the first visual angle; and combining the re-projected first content frame with the N skybox layers to generate a first visual content and outputting the first visual content.

20 Claims, 2 Drawing Sheets

BACKGROUND SKYBOX CONSTRUCTING METHOD AND ELECTRONIC DEVICE

BACKGROUND

1. Field of the Invention

The present disclosure generally relates to a mechanism for improving visual experiences, in particular, to a background skybox constructing method and an electronic device.

2. Description of Related Art

During providing virtual reality (VR) services, it is critical to make users feel immersive. In some cases, when the frame rate drops for some reasons (e.g., heavy scene rendering), techniques like re-projection (e.g., asynchronous time wrap (ATW), asynchronous space wrap (ASW), etc.) may be used to interpret the missing frame to maintain the VR experience. However, with these re-projection techniques, there could exist black borders in the visual contents, such that the immersive experience would be negatively affected.

The same problem occurs within remote VR streaming, since the longer latency due to streaming will also introduce such black border after re-projection.

SUMMARY OF THE INVENTION

Accordingly, the disclosure is directed to a background skybox constructing method and an electronic device, which may be used to solve the above technical problems.

The embodiments of the disclosure provide a background skybox constructing method, adapted to an electronic device. The method includes: obtaining a first content frame and re-projecting the first content frame, wherein the re-projected first content frame corresponds to a first visual angle and includes a plurality of first objects; in response to determining that the first content frame has a first depth map characterizing a depth of each first object, dividing the first objects into N first groups based on the depth of each first object, wherein N is a positive integer; constructing a first part of each of N skybox layers based on the N first groups, wherein the first part of each skybox layer corresponds to the first visual angle; and combining the re-projected first content frame with the N skybox layers to generate a first visual content and outputting the first visual content.

The embodiments of the disclosure provide an electronic device including a storage circuit and a processor. The storage circuit stores a program code. The processor is coupled to the storage circuit and accesses the program code to perform: obtaining a first content frame and re-projecting the first content frame, wherein the re-projected first content frame corresponds to a first visual angle and includes a plurality of first objects; in response to determining that the first content frame has a first depth map characterizing a depth of each first object, dividing the first objects into N first groups based on the depth of each first object, wherein N is a positive integer; constructing a first part of each of N skybox layers based on the N first groups, wherein the first part of each skybox layer corresponds to the first visual angle; and combining the re-projected first content frame with the N skybox layers to generate a first visual content and outputting the first visual content.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
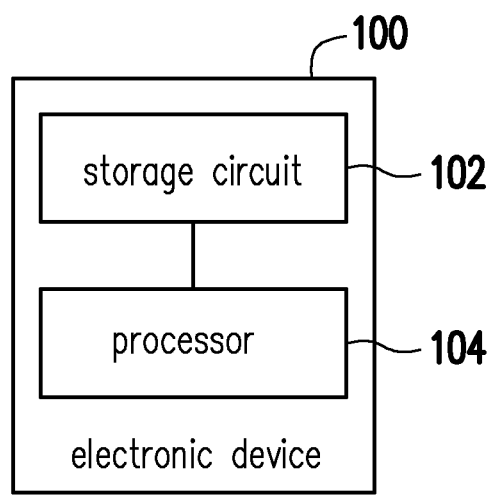
FIG. 1 shows a schematic diagram of an electronic device according to an exemplary embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of an electronic device according to an exemplary embodiment of the disclosure. In various embodiments, the electronic device 100 may be any devices that could provide visual contents (e.g., VR contents) to the user. In the embodiments of the disclosure, the electronic device 100 may be a host of a VR system, wherein the VR system may include other elements such as a head-mounted display (HMD), a VR controller, a position tracking element, but the disclosure is not limited thereto. In other embodiments, the electronic device 100 may also be a standalone VR HMD, which may generate and display VR contents to the user thereof, but the disclosure is not limited thereto.

In FIG. 1, the handheld device 100 includes a storage circuit 102 and a processor 104. The storage circuit 102 is one or a combination of a stationary or mobile random access memory (RAM), read-only memory (ROM), flash memory, hard disk, or any other similar device, and which records a plurality of modules that can be executed by the processor 104.

The processor 104 may be coupled with the storage circuit 102, and the processor 104 may be, for example, a graphic processing unit (GPU), a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 may access the modules and/or the program codes stored in the storage circuit 102 to implement the background skybox constructing method provided in the disclosure, which would be further discussed in the following.

Figure 2:
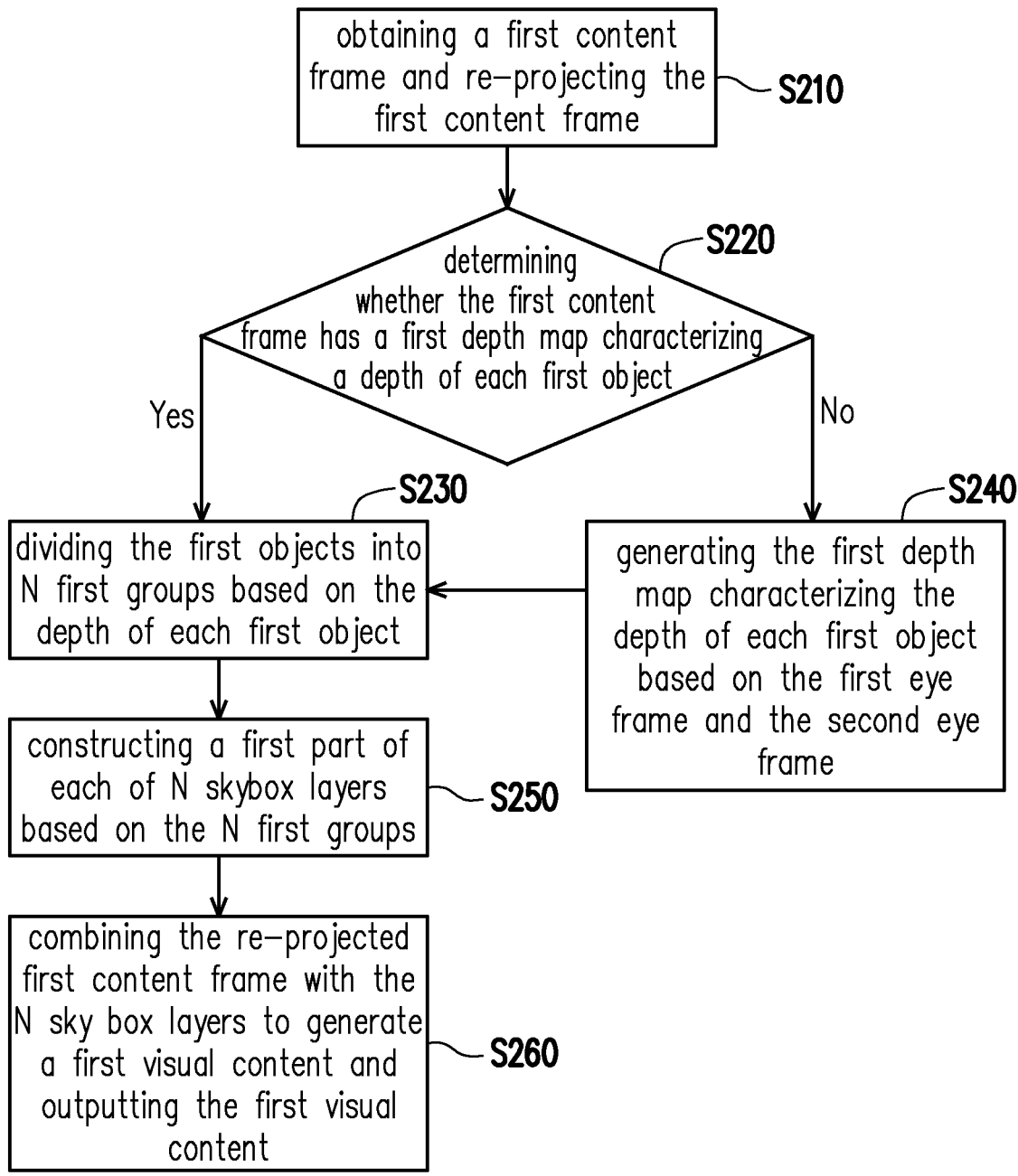
FIG. 2 shows a flow chart of the background skybox constructing method according to an embodiment of the disclosure.

See FIG. 2, which shows a flow chart of the background skybox constructing method according to an embodiment of the disclosure. The method of this embodiment may be executed by the electronic device 100 in FIG. 1, and the details of each step in FIG. 2 will be described below with the components shown in FIG. 1.

Firstly, in step S210, the processor 104 may obtain a first content frame and re-projecting the first content frame. In the embodiments, the first content frame may be one of the image frames related to the VR services provided by the processor 104, and the re-projected first content may correspond to a first visual angle and include a plurality of first objects (e.g., VR objects).

More specifically, as mentioned in the above, the processor 104 may need to re-project the first content frame by performing ASW or ATW in some scenarios. For example, the electronic device 100 may provide/show the first content frame to the user when the user views the first content frame with a certain visual angle. However, in a low frame rate condition or the like, there may be some missing frames. Assuming that the content frame next to the first content frame is missing and the user changes his/her visual angle to be the first visual angle at the timing corresponding to the content frame next to the first content frame, the processor 104 may need to re-project the first content frame.

However, there may exist some black borders in the re-projected first content frame. If the re-projected first content frame is directly displayed to the user, the VR experience of the user may be affected due to seeing the black borders. Accordingly, the method of the disclosure may be used to solve this problem, which would be discussed in the following.

Specifically, in step S220, the processor 104 may determine whether the first content frame has a first depth map characterizing a depth of each first object. If yes, the processor 104 may proceed to step S230; if not, the processor 104 may proceed to step S240, wherein the details of step S240 would be discussed later.

In step S230, the processor 104 may divide the first objects into N first groups based on the depth of each first object, wherein N is a positive integer. In one embodiment, the processor 104 may firstly obtain N depth thresholds (represented by $T_1$-$T_N$), wherein the N depth thresholds may be determined based on the requirements of the designer, but the disclosure is not limited thereto.

In one embodiment, a j-th depth threshold (i.e., $T_j$) of the depth thresholds may be larger than a (j−1)-th depth threshold (i.e., $T_{j-1}$) of the depth thresholds, wherein j ranges from 2 to N. That is, $T_1$-$T_N$ may be arranged in an ascending order, but the disclosure is not limited thereto.

Next, during determining an i-th (wherein i ranges from 1 to N) first group (represented by $G_i$) of the N first groups, the processor 104 may define the first objects with a depth smaller than $T_i$ as belonging to the $G_i$. That is, $G_i$ would include the first objects whose depth is smaller than $T_i$.

In this case, $G_1$ would include the first objects with a depth smaller than $T_1$, $G_2$ would include the first objects with a depth smaller than $T_2$, and $G_N$ would include the first objects with a depth smaller than $T_N$, and so on. In addition, in cases where $T_i$-$T_N$ are arranged in the ascending order, $G_1$ would include all of the first objects belonging to $G_{j-1}$ and other first objects whose depth is between $T_{j-1}$ and $T_j$. In some cases, $G_N$ may include all of the first objects, but the disclosure is not limited thereto.

Afterwards, in step S250, the processor 104 may construct a first part of each of N skybox layers based on the N first groups, wherein the first part of each skybox layer may correspond to the first visual angle. In the embodiments of the disclosure, a j-th skybox layer (represented as $L_j$) of the skybox layers may surround a (j−1)-th skybox layer (represented as $L_{j-1}$) of the skybox layers. That is, $L_j$ may be understood of being outside of $L_{j-1}$, or $L_j$ is farther from the user than $L_{j-1}$, but the disclosure is not limited thereto.

In one embodiment, during constructing the first part of an i-th skybox layer (i.e., $L_i$), the processor 104 may map the first objects in the i-th first group (i.e., $G_i$) onto $L_i$. In this case, the first objects belonging to $G_1$ would be shown on $L_i$.

In step S260, the processor 104 may combine the re-projected first content frame with the N skybox layers to generate a first visual content and output the first visual content.

In one embodiment, during combining the re-projected first content frame with the N skybox layers, the processor 104 may use the re-projected first content frame as a foreground of the first visual content and use the N skybox layers as a background of the first visual content.

From another perspective, since the first part of each skybox layer correspond to the first visual angle of the user, step S250 may be understood as constructing a background part where the user is looking at, but the disclosure is not limited thereto. Accordingly, the black borders originally existed in the re-projected first content frame would be filled with the N skybox layers, such that there would be no black border in the first visual content.

In one embodiment, if the electronic device 100 is a standalone VR HMD, the processor 104 may display the first visual content for the user to see. In another embodiment, if the electronic device 100 is the host of the VR system, the electronic device 100 may provide the first visual content to the HMD of the VR system for the user to see. Therefore, the VR experience of the user would not be affected by the black borders.

Referring back to step S240, since the first content frame may include a first eye frame (e.g., the frame for the left eye) and the second eye frame (e.g., the frame for the right eye), the processor 104 may generate the first depth map characterizing the depth of each first object based on the first eye frame and the second eye frame and proceed to step S230. In various embodiments, the mechanisms for the processor 104 to generate the first depth map based on the first eye frame and the second eye frame may be any relevant algorithms in the art, which would not be further discussed.

In one embodiment, the processor 104 may determine whether a processing loading (e.g., the loading of the processor 104) is lower than a load threshold. If yes, it represents that the processor 104 may be idle enough to generate the first depth map based on the first eye frame and the second eye frame, and hence the processor 104 may generate the first depth map characterizing the depth of each first object based on the first eye frame and the second eye frame.

On the other hand, in response to determining that the processing loading is not lower than the load threshold, it represents that the processor 104 may be too busy to generate the first depth map based on the first eye frame and the second eye frame. In this case, the processor 104 may construct the first part of an N-th skybox layer (i.e., $L_N$) based on all of the first objects. That is, when the processing load is too high, the processor 104 may merely construct the first part of $L_N$ (which may be the farthest skybox layer from the user), but the disclosure is not limited thereto.

In other embodiments, the user may look around when using the VR services, and hence the embodiments of the disclosure may gradually construct each of the skybox layers piece by piece along with the variations of the visual angle of the user.

For example, the processor 104 may obtain a second content frame and re-project the second content frame, wherein the re-projected second content frame may correspond to a second visual angle different from the first visual angle, and the re-projected second content frame may include a plurality of second objects. In response to determining that the second content frame has a second depth map characterizing a depth of each second object, the processor 104 may divide the second objects into N second groups based on the depth of each second object and construct a second part of each skybox layer based on the N second groups, wherein the second part of each skybox layer corresponds to the second visual angle. Next, the processor 104 may combine the re-projected second content frame with the N skybox layers to generate a second visual content and output the second visual content. The details of the above technical means may be referred to the teachings in the above embodiments, which would not be repeated herein.

In brief, when the visual angle of the user changes to be the second visual angle, the processor 104 may correspondingly construct the second part of each skybox layer, such that there would be no black borders in the second visual content, but the disclosure is not limited thereto.

However, different VR scenes may correspond to different backgrounds. Therefore, in some embodiments, before constructing the second part of each skybox layer, the processor 104 may determine whether the second content frame and the first content frame correspond to different scenes. In response to determining that the second content frame and the first content frame correspond to different scenes, the processor 104 may reset the N skybox layers.

That is, when the processor 104 determines that the VR environment has been changed to a new scene, the processor 104 may reset/clear the previously constructed skybox layers and gradually construct the skybox layers corresponding to the new scene along with the variations of the visual angle of the user, but the disclosure is not limited thereto.

In summary, after re-projecting the first content frame, the embodiments of the disclosure may separate the first objects in the first content frame based on their depth and accordingly map the first objects to the corresponding skybox layer. Afterwards, the re-projected first content frame may be combined with the skybox layers to generate the first visual content without black borders. Accordingly, the VR experience of the user may be improved.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A background skybox constructing method, adapted to an electronic device, comprising:
   obtaining a first content frame and re-projecting the first content frame, wherein the re-projected first content frame corresponds to a first visual angle and comprises a plurality of first objects;
   in response to determining that the first content frame has a first depth map characterizing a depth of each first object, dividing the plurality of first objects into N first groups based on the depth of each first object, wherein N is a positive integer;
   constructing a first part of each of N skybox layers based on the N first groups, wherein the first part of each of the N skybox layers corresponds to the first visual angle; and
   combining the re-projected first content frame with the N skybox layers to generate a first visual content and outputting the first visual content.

2. The method according to claim 1, wherein an i-th first group of the N first groups comprises a subset of the plurality of first objects, wherein each member in the i-th first group has a depth smaller than an i-th depth threshold of N depth thresholds, i ranges from 1 to N, wherein a j-th depth threshold of the depth thresholds is larger than a (j−1)-th depth threshold of the depth thresholds, wherein j ranges from 2 to N.

3. The method according to claim 2, wherein the step of constructing the first part of each of the N skybox layers based on the N first groups comprising:
   mapping each member in the i-th first group of the first onto an i-th skybox layer.

4. The method according to claim 1, wherein a j-th skybox layer of the N skybox layers surrounds a (j−1)-th skybox layer of the N skybox layers, wherein j ranges from 2 to N.

5. The method according to claim 1, wherein the first content frame comprises a first eye frame and a second eye frame, and the method further comprises:
   in response to determining that the first content frame has no depth map, generating the first depth map characterizing the depth of each first object based on the first eye frame and the second eye frame.

6. The method according to claim 5, further comprising:
   in response to determining that a processing loading is lower than a load threshold, generating the first depth map characterizing the depth of each first object based on the first eye frame and the second eye frame; and
   in response to determining that the processing loading is not lower than the load threshold, constructing the first part of an N-th skybox layer based on all of the plurality of first objects.

7. The method according to claim 1, wherein the re-projected first content frame is used as a foreground of the first visual content, and the N skybox layers are used as a background of the first visual content.

8. The method according to claim 1, wherein the electronic device is a host of a virtual reality (VR) system or a standalone VR head-mounted display.

9. The method according to claim 1, further comprising:
   obtaining a second content frame and re-projecting the second content frame, wherein the re-projected second content frame corresponds to a second visual angle, and comprises a plurality of second objects;
   in response to determining that the second content frame has a second depth map characterizing a depth of each second object, dividing the plurality of second objects into N second groups based on the depth of each second object;
   constructing a second part of each of the N skybox layers based on the N second groups, wherein the second part of each of the N skybox layers corresponds to the second visual angle; and
   combining the re-projected second content frame with the N skybox layers to generate a second visual content and outputting the second visual content.

10. The method according to claim 9, wherein before the step of constructing the second part of each of the N skybox layers, the method further comprises:
   in response to determining that the second content frame and the first content frame correspond to different scenes, resetting the N skybox layers.

11. An electronic device, comprising:
   a non-transitory storage circuit, storing a program code; and
   a processor, coupled to the storage circuit and accessing the program code to perform:
      obtaining a first content frame and re-projecting the first content frame, wherein the re-projected first content frame corresponds to a first visual angle and comprises a plurality of first objects;

in response to determining that the first content frame has a first depth map characterizing a depth of each first object, dividing the plurality of first objects into N first groups based on the depth of each first object, wherein N is a positive integer;

constructing a first part of each of N skybox layers based on the N first groups, wherein the first part of each of the N skybox layers corresponds to the first visual angle; and combining the re-projected first content frame with the N skybox layers to generate a first visual content and outputting the first visual content.

12. The electronic device according to claim 11, wherein an i-th first group of the N first groups comprises a subset of the plurality of first objects, wherein each member in the i-th first group has a depth smaller than an i-th depth threshold of N depth thresholds, i ranges from 1 to N, wherein a j-th depth threshold of the depth thresholds is larger than a (j−1)-th depth threshold of the depth thresholds, wherein j ranges from 2 to N.

13. The electronic device according to claim 12, wherein the processor maps each member in the i-th first group onto an i-th skybox layer when constructing the first part of each of the N skybox layers based on the N first groups.

14. The electronic device according to claim 11, wherein a j-th skybox layer of the N skybox layers surrounds a (j−1)-th skybox layer of the N skybox layers, wherein j ranges from 2 to N.

15. The electronic device according to claim 11, wherein the first content frame comprises a first eye frame and a second eye frame, and the processor further performs:

in response to determining that the first content frame has no depth map, generating the first depth map characterizing the depth of each first object based on the first eye frame and the second eye frame.

16. The electronic device according to claim 15, wherein the processor further performs:

in response to determining that a processing loading is lower than a load threshold, generating the first depth map characterizing the depth of each first object based on the first eye frame and the second eye frame; and in response to determining that the processing loading is not lower than the load threshold, constructing the first part of an N-th skybox layer based on all of the plurality of first objects.

17. The electronic device according to claim 11, wherein the re-projected first content frame is used as a foreground of the first visual content, and the N skybox layers are used as a background of the first visual content.

18. The electronic device according to claim 11, wherein the electronic device is a host of a virtual reality (VR) system or a standalone VR head-mounted display.

19. The electronic device according to claim 11, wherein the processor further performs:

obtaining a second content frame and re-projecting the second content frame, wherein the re-projected second content frame corresponds to a second visual angle and comprises a plurality of second objects;

in response to determining that the second content frame has a second depth map characterizing a depth of each second object, dividing the plurality of second objects into N second groups based on the depth of each second object;

constructing a second part of each of the N skybox layers based on the N second groups, wherein the second part of each of the N skybox layers corresponds to the second visual angle; and combining the re-projected second content frame with the N skybox layers to generate a second visual content and outputting the second visual content.

20. The electronic device according to claim 19, wherein before constructing the second part of each of the N skybox layer, the processor further performs:

in response to determining that the second content frame and the first content frame correspond to different scenes, resetting the N skybox layers.

* * * * *